United States Patent
Yokoyama et al.

(10) Patent No.: US 7,361,318 B2
(45) Date of Patent: Apr. 22, 2008

(54) SODIUM HYDROGENCARBONATE CRYSTAL PARTICLES

(75) Inventors: Kouichi Yokoyama, Kitakyushu (JP);
Sadaji Narituka, Kitakyushu (JP);
Kiyoshi Yamamoto, Yokohama (JP);
Hachiro Hirano, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 593 days.

(21) Appl. No.: 10/397,174

(22) Filed: Mar. 27, 2003

(65) Prior Publication Data

US 2003/0211027 A1 Nov. 13, 2003

(30) Foreign Application Priority Data

Mar. 29, 2002 (JP) .............................. 2002-096672

(51) Int. Cl.
*C01D 1/32* (2006.01)
(52) U.S. Cl. ..................................................... 423/184
(58) Field of Classification Search ................ 423/184, 423/206.1, 208, 209, 422
See application file for complete search history.

(56) References Cited

U.S. PATENT DOCUMENTS 2,900,232 A * 8/1959 Lafont ....................... 423/190
5,422,087 A 6/1995 Lajoie
6,692,716 B1 * 2/2004 Phinney ...................... 423/422
2003/0211027 A1 11/2003 Yokoyama et al.

FOREIGN PATENT DOCUMENTS

WO    WO 99/38800    8/1999

OTHER PUBLICATIONS

Patent Abstracts of Japan, JP 05-058622, Mar. 9, 1993.
Patent Abstracts of Japan, JP 10-310407, Nov. 24, 1998.
U.S. Appl. No. 11/619,286, filed Jan. 3, 2007, Hirano et al.
U.S. Appl. No. 11/619,411, filed Jan. 3, 2007, Hirano et al.
U.S. Appl. No. 11/616,296, filed Dec. 27, 2006, Hirano et al.

* cited by examiner

*Primary Examiner*—Edward M. Johnson
(74) *Attorney, Agent, or Firm*—Oblon, Spivak, McClelland, Maier & Neustadt, P.C.

(57) ABSTRACT

A method for producing sodium hydrogencarbonate crystal particles having a low caking property, which comprises lowering the potassium concentration in sodium hydrogencarbonate crystal particles having a mean particle diameter of from 50 to 500 μm to a level of at most 50 mass ppm.

9 Claims, No Drawings

SODIUM HYDROGENCARBONATE CRYSTAL PARTICLES

The present invention relates to a novel method for producing sodium hydrogencarbonate crystal particles having a low caking property, which is useful particularly in the sector of food products, pharmaceuticals, etc. and which requires no necessity to contain an anticaking agent, and such sodium hydrogencarbonate crystal particles having a low caking property.

Heretofore, sodium hydrogencarbonate (which is also called sodium bicarbonate) is widely used in the sector of various food products, as an additive for baking powders, soft drinks, etc., in the pharmaceutical industry as a dialysate, an antacid, etc., and further as a fire-extinguishing agent, as a bath additive, as a detergent, etc. In most cases, such sodium hydrogencarbonate is produced, transported, stored, sold or used in the form of powdery or granular crystal particles.

However, crystal particles of sodium hydrogencarbonate show a caking property and will readily decompose and change into sodium carbonate and will have a big caking property, especially in the atmosphere in the presence of moisture at a high temperature. If caking results, the flowability of the particles will be low, and the handling efficiency will deteriorate remarkably in each step of the above distirbution, and various troubles are likely to be brought about. Further, the caking is a serious problem which may impair the commercial value of the sodium hydrogencarbonate.

In order to prevent the caking of crystal particles of sodium hydrogencarbonate, e.g. JP-A-5-58622 proposes to incorporate various anticaking agents, such as stearates, carbonates, phosphates, silicates, kaolin, talc or silicon dioxide, or to use a special material having a low moisture permeability for packaging sodium hydrogencarbonate.

However, such a conventional method for incorporating an anticaking agent, not only requires a cost for the anticaking agent or a process of its incorporation, but also requires selection of the type of the anticaking agent depending upon the particular application. Further, for food products, pharmaceuticals, etc., it is impossible to use it, or its use may be limited. Further, in a case where an anticaking agent or the like is incorporated, the application may be thereby restricted, and a due care will be required for its sales. On the other hand, also the method of using a special packaging material having a low moisture permeability, not only increases the cost, but also will not essentially prevent caking, since the effect will be lost immediately if the packaging is once opened.

Under these circumstances, it is an object of the present invention to provide a novel method for producing sodium hydrogencarbonate crystal particles having a low caking property, and such sodium hydrogencarbonate crystal particles, whereby the caking can be prevented even without using an anticaking agent which has been used in the conventional method, or without using e.g. a special packaging material having a low moisture permeability, and as a result, it is not required to select the type of the anticaking agent, or its use will not be limited.

The present inventors have conducted an extensive study for prevention of caking of sodium hydrogencarbonate crystal particles, and as a result, have found it possible to prevent caking of sodium hydrogencarbonate crystal particles by lowering as far as possible the concentration of certain impurities contained in the sodium hydrogencarbonate crystal particles, as is different from the conventional method of using an additive such as an anticaking agent. Namely, it has been found by the present inventors that the presence of potassium contained in the sodium hydrogencarbonate crystal particles, is significantly concerned in the caking of the crystal particles, and it is possible to remarkably prevent the caking by lowering the potassium concentration as far as possible.

Potassium contained in sodium hydrogencarbonate crystal particles is attributable to potassium which is originally contained as impurities in sodium hydroxide or sodium carbonate as the raw material for sodium hydrogencarbonate. Surprisingly, according to the findings by the present inventors, it has been proved that when crystal particles of sodium hydrogencarbonate are produced by crystallization from its mother liquor, potassium in the mother liquor will not be incorporated into the inside of the sodium hydrogencarbonate crystal particles, and most of it is selectively present on the surface or in the surface layer of the produced crystal particles. This behavior lends potassium its distinction as compared with other metal ions. For example, as shown in the following Reference Example, calcium is incorporated into the inside of the sodium hydrogencarbonate crystal particles, and is not selectively present only on the surface or in the surface layer of the crystal particles, as in the case of potassium.

On the other hand, potassium, as a potassium salt such as potassium hydrogencarbonate, potassium carbonate or potassium chloride, has higher hygroscopic property and caking property than sodium hydrogencarbonate, and potassium is present on the surface or in the surface layer of the sodium hydrogencarbonate crystal particles as mentioned above, whereby it is directly influenced by the temperature of the atmosphere or by moisture in the atmosphere, thus causing a significant caking property of the sodium hydrogencarbonate crystal particles. Accordingly, the sodium hydrogencarbonate crystal particles have a remarkably significant caking property when potassium is present even in a slight amount on the surface or in the surface layer of the sodium hydrogencarbonate crystal particles.

Further, it has been found that the caking of the sodium hydrogencarbonate crystal particles can be more suppressed by simultaneously lowering the carbonate ion concentration in addition to the potassium concentration in the sodium hydrogencarbonate crystal particles. The reason is not clearly understood, but is guessed as follows. That is, a carbonate of an alkali metal is likely to form hydrate crystals having a high hygroscopic property as compared with a hydrogencarbonate, and in a case where potassium or sodium present on the surface or in the surface layer of the sodium hydrogencarbonate crystal particles forms such a carbonate having a high hygroscopic property, even if its amount is slight, moisture is absorbed by such a hygroscopic carbonate, thus causing caking of the sodium hydrogencarbonate crystal particles. The higher the degree of selective distribution on the surface, the more remarkable the influence is. Further, it has been further found that it is similarly effective to prevent caking by lowering the carbonate ion concentration, independently of the potassium content. A carbonate is present selectively on the surface or in the surface layer of the crystal particles, because a carbonate is formed on the surface or in the surface layer of the crystal particles by drying the crystal particles in excess, or a carbonate in the mother liquor is present on the surface or in the surface layer of the crystal particles by adhesion of the mother liquor.

The present invention is based on the above novel findings, and provides the following constitutions.

1. A method for producing sodium hydrogencarbonate crystal particles having a low caking property, which comprises lowering the potassium concentration in sodium hydrogencarbonate crystal particles having a mean particle diameter of from 50 to 500 μm to a level of at most 50 mass ppm.

2. The method for producing sodium hydrogencarbonate crystal particles having a low caking property according to the above item 1, wherein the carbonate ion concentration in the sodium hydrogencarbonate crystal particles is lowered to a level of at most 1 mass % which is the value converted from carbonate ion concentration to sodium carbonate concentration, hereinafter the same.

3. A method for producing sodium hydrogencarbonate crystal particles having a low caking property, which comprises lowering the carbonate ion concentration in sodium hydrogencarbonate crystal particles having a mean particle diameter of from 50 to 500 μm to a level of at most 1 mass %.

4. The method for producing sodium hydrogencarbonate crystal particles having a low caking property according to the above item 1, 2 or 3, wherein the potassium content in the sodium hydrogencarbonate crystal particles is lowered to a level of at most 50 mass ppm by rinsing the sodium hydrogencarbonate crystal particles with water or an aqueous solution containing sodium hydrogencarbonate, followed by drying.

5. The method for producing sodium hydrogencarbonate crystal particles having a low caking property according to the above item 4, wherein said water or aqueous solution containing sodium hydrogencarbonate, is a saturated aqueous solution of sodium hydrogencarbonate.

6. The method for producing sodium hydrogencarbonate crystal particles having a low caking property according to the above item 1, 2 or 3, wherein the sodium hydrogencarbonate crystal particles are produced by crystallization from a mother liquor of an aqueous solution containing sodium hydrogencarbonate, wherein the potassium concentration in the mother liquor is lowered to a level of at most 400 mass ppm thereby to lower the potassium content in the sodium hydrogencarbonate crystal particles to a level of at most 50 mass ppm.

7. Sodium hydrogencarbonate crystal particles having a low caking property, which has a mean particle diameter of from 50 to 500 μm, a potassium concentration in the crystal particles of at most 50 mass ppm, and a carbonate ion concentration in the crystal particles of at most 1 mass %.

8. An anticaking method for sodium hydrogencarbonate, which comprises hermetically sealing the sodium hydrogencarbonate crystal particles as defined in any one of the above items 1 to 7, by a packaging material having a moisture permeability of at most 5 g/(m²·day) at 40° C., as stipulated in JIS Z0208.

Now, the present invention will be described in detail with reference to the preferred embodiment.

The sodium hydrogencarbonate crystal particles of which caking is prevented in the present invention may be ones used in various fields, but the present invention is particularly effective for sodium hydrogencarbonate used in the sector of food products, pharmaceuticals, etc., in which it is impossible to incorporate an anticaking agent or its incorporation is limited. The size of the sodium hydrogencarbonate crystal particles relates to the caking property, and the present invention is effective for ones having a mean particle diameter of from 50 to 500 μm, preferably from 50 to 400 μm. In the present invention, the mean particle diameter is defined as the particle size of particles at 50% in cumulative particle size distribution based on mass by means of sieve analysis. If the mean particle diameter is smaller than 50 μm, the influence of force between particles tends to be greater than that of the particles' own weight, and the influence of factors which affect the force between particles, such as temperature and humidity, tends to be great. Accordingly, the crystal particles are likely to undergo caking essentially, and although caking is less likely to take place by the present invention, its effect tends to be low. On the other hand, if the mean particle diameter exceeds 500 μm, the particles' own weight tends to be heavy, and the influence of caking between particles tends to decrease, whereby the crystal particles are likely to crumble essentially even when they undergo caking, and although caking is less likely to take place by the present invention, its effect tends to be low.

In the present invention, it is necessary to remove potassium present in the sodium hydrogencarbonate crystal particles thereby to lower its concentration as far as possible for prevention of caking. It is ideal to completely remove potassium in the crystal particles, but such is not practical in view of cost, and further, it has been found that excessive removal is not so effective in view of the effect of preventing caking. Accordingly, it has been proved that the potassium concentration in the crystal particles is preferably at most 50 mass ppm, more preferably at most 30 mass ppm, and particularly preferably the total potassium concentration is at most 10 mass ppm. The potassium concentration in the crystal particles can be measured by a conventional method by dissolving the sodium hydrogencarbonate crystal particles. Further, as mentioned above, potassium is present substantially on the surface or in the surface layer of the sodium hydrogencarbonate crystal particles, and accordingly, the tendency can be known by measuring the potassium concentration on the surface or in the surface layer of the crystal particles simply by electron spectroscopy for chemical analysis (ESCA).

In the present invention, in order to produce sodium hydrogencarbonate crystal particles having the potassium concentration lowered as far as possible, the following method is preferably employed. One method is a method of rinsing the sodium hydrogencarbonate crystal particles with water or an aqueous solution containing sodium hydrogencarbonate, followed by drying. In this method, as the aqueous solution containing sodium hydrogencarbonate, preferably an aqueous solution having a sodium hydrogencarbonate concentration of at least 5 mass %, more preferably a saturated aqueous solution of sodium hydrogencarbonate is used, so as to prevent loss of the sodium hydrogencarbonate crystal particles by dissolution at the time of the rinse. For the rinse, whether water or the aqueous solution containing sodium hydrogencarbonate is used, and what degree of the concentration of the aqueous solution containing sodium hydrogencarbonate is employed if it is used, are determined depending upon the degree of lowering the potassium concentration in the sodium hydrogencarbonate crystal particles, the particle size of the sodium hydrogencarbonate crystal particles, or the type of solid-liquid separation operation to be employed to obtain sodium hydrogencarbonate crystal particles from the slurry after crystallization. Rinsing is carried out preferably by contacting water or the aqueous solution containing sodium hydrogencarbonate with the sodium hydrogencarbonate crystal particles by spraying or shower.

The method of rinsing is carried out preferably while carrying out suction filtration of a slurry comprising of the sodium hydrogencarbonate crystal particles obtained by crystallization and the mother liquor put in a suction filter, so as to rapidly remove the sprayed aqueous solution. Further, in a case where the rinse is carried out in a large scale, the sodium hydrogencarbonate crystal particles may be put in a centrifugal separator, instead of the suction filter, and water or the aqueous solution containing sodium hydrogencarbonate is sprayed. The rinse with water or the aqueous solution containing sodium hydrogencarbonate is repeatedly carried out as the case requires so that the potassium concentration in the crystal particles reaches the above predetermined concentration or lower, however, in the case of centrifugal separation, it is carried out for a predetermined time. In order to increase removal efficiency by means of the rinse, it is carried out preferably at a temperature of water or the aqueous solution containing sodium hydrogencarbonate of from 1 to 60° C.

After the rinse, the sodium hydrogencarbonate crystal particles are dried. The drying is carried out, industrially, preferably by using gas of from 50 to 500° C., particularly preferably from 50 to 350° C., for from 1 to 120 minutes. In order to prevent decomposition of sodium hydrogencarbonate by drying, it is carried out preferably in an atmosphere containing from 3 to 100 vol % of carbon dioxide. After the drying, the crystal particles are sieved to have a grain size depending upon the particular application by using a pertinent sieving machine. When crystal particles having a smaller particle size are required, the crystal particles may be pulverized by means of a pulverizer.

Another preferred method for producing sodium hydrogencarbonate crystal particles having a low caking property of the present invention, is a method wherein the sodium hydrogencarbonate crystal particles are produced by crystallization from a mother liquor of an aqueous solution containing sodium hydrogencarbonate, wherein the potassium concentration in the mother liquor is controlled. Sodium hydrogencarbonate is produced generally by blowing carbon dioxide gas into an aqueous solution system containing sodium hydroxide and/or sodium carbonate to form a bicarbonate, and precipitating crystal particles of sodium hydrogencarbonate. In the present invention, a method of lowering the potassium concentration in the mother liquor from which crystal particles of sodium hydrogencarbonate are crystallized to a level of at most 400 mass ppm.

Potassium contained in the mother liquor from which the sodium hydrogencarbonate crystal particles are crystallized, will not be incorporated into the inside of the crystallized sodium hydrogencarbonate crystal particles, but is selectively present on the surface or in the surface layer of the obtained crystal particles. In this case, when the mean particle diameter of the obtained crystal particles is from 50 to 500 µm, the potassium concentration in the crystallized crystal particles can be lowered to a level of at most 50 mass ppm by controlling the potassium concentration in the mother liquor from which the sodium hydrogencarbonate crystal particles are crystallized to be within the above range.

In order to further lower the potassium concentration in the crystal particles, a further lower potassium concentration in the mother liquor is also required. Thus, in order that the potassium concentration in the crystal particles is lowered to a level of at most 30 mass ppm, the potassium concentration in the mother liquor is lowered preferably to a level of at most 300 mass ppm. Further, in order that the potassium concentration in the crystal particles is lowered to a level of at most 20 mass ppm, the potassium concentration in the mother liquor is lowered preferably to a level of at most 200 mass ppm. The method of lowering the potassium concentration in the mother liquor and the above-described method of the rinse may be employed together.

The above obtained crystal particles of sodium hydrogencarbonate are dried in the same manner as the aforementioned method. Further, after the drying, the crystal particles are sieved to have a grain size depending upon the particular application by means of a pertinent sieving machine.

Further, in a case where crystal particles having a smaller particle size are required, the crystal particles may be pulverized by means of a pulverizer. Removal of potassium on the surface of the crystal particles by rinsing is carried out preferably before pulverization, whereby rinsing and drying operations are readily carried out.

Further, it has been proved that the anticaking property of the sodium hydrogencarbonate crystal particles can further be improved when the carbonate ion concentration in the sodium hydrogencarbonate crystal particles is preferably at most 1 mass %, in addition to the potassium concentration in the sodium hydrogencarbonate crystal particles. The carbonate ions in the crystal particles are present as a sodium salt or a potassium salt, and if the concentration exceeds 1 mass %, the hygroscopic degree tends to be high, and accordingly the caking property of the crystal particles is considered to increase. Particularly when the carbonate ion concentration is preferably at most 0.1 mass %, the caking property can be made particularly low.

In the present invention, as a method of controlling the carbonate ion concentration in the sodium hydrogencarbonate crystal particles to be within the above range, the following method is preferably employed. Namely, in the drying process in production of sodium hydrogencarbonate crystal particles, by using as a drying gas, a drying gas having a carbon dioxide gas concentration of preferably at least 3 vol %, particularly preferably at least 10 vol %, the carbonate ion concentration will easily be controlled, whereby decomposition of the sodium hydrogencarbonate crystal particles into sodium carbonate can be suppressed, and further, the carbonate ions contained in the mother liquor react with carbon dioxide gas and are converted into hydrogencarbonate ions, thus lowering the sodium carbonate concentration. Further, it is also possible to rinse out the adhered mother liquor by rinsing with water for removal of potassium, thereby to reduce sodium carbonate simultaneously.

As mentioned above, according to the present invention, sodium hydrogencarbonate crystal particles having a low caking property can be obtained without incorporating e.g. an anticaking agent as in a conventional method, and accordingly products excellent in handling efficiency and having a high commercial value even when used in the sector of food products, pharmaceuticals, etc., can be provided. However, the present invention does not necessarily exclude incorporation of an anticaking agent into the sodium hydrogencarbonate crystal particles, and in a case where a higher anticaking property or a higher flowability as fine particles is required, needless to say, an anticaking agent can be incorporated depending upon the particular application.

Now, the present invention will be explained in further detail with reference to Examples. However, it should be understood that the present invention is by no means restricted to such specific Examples.

In Examples, the potassium content in crystal particles was measured by means of a flame photometer by dissolving sodium hydrogencarbonate crystal particles in water. Further, the carbonate ion content in crystal particles was measured by means of Winkler titration as a neutralization titration method by dissolving sodium hydrogencarbonate crystal particles in water, and the carbonate ion concentration is converted to $Na_2CO_3$ concentration.

Further, the degree of caking of sodium hydrogencarbonate crystal particles was visually observed and evaluated into the following four grades.

Nil: No caking confirmed at all.

Slight: When the crystal particles were scooped up by hands, blocks of several cm were confirmed even though their amount was small. The blocks were in such a state that they crumbled to the touch.

Moderate: When the crystal particles were scooped up by hands, blocks of several cm were found here and there. The blocks were in such a state that they crumbled when pinched.

Remarkable: When the crystal particles were scooped up by hands, fist-sized blocks were confirmed. The blocks were in such a state that they crumbled when grasped.

EXAMPLE 1

Two types of sodium hydrogencarbonate crystal particles having mean particle diameters of about 95 μm and about 235 μm, respectively, having various potassium concentrations in the sodium hydrogencarbonate crystal particles as identified in Table 1, were produced by changing the conditions for production of the sodium hydrogencarbonate crystal particles, and 25 kg each was prepared.

Five packaging bags having 25 kg of each of the sodium hydrogencarbonate crystals particles packed therein were piled up, which were stored at a temperature of 25° C. for 4 weeks, and then the caking property of the crystal particles packed in the lowermost packaging bag was tested. The results of the test were as shown in Table 1.

eter of 50 cm having a filter paper (filter paper for qualitative analysis No. 2, manufactured by Advantec Co., Ltd.) set thereto.

On the other hand, using a separately prepared saturated aqueous solution of sodium hydrogencarbonate, the saturated aqueous solution was sprayed on the sodium hydrogencarbonate crystal particles contained in the Buchner funnel by means of a sprayer to rinse the surface of the crystal particles. The rinsed sodium hydrogencarbonate crystal particles were dried in an atmosphere of 40 vol % carbon dioxide gas at 70° C. for 5 hours. After the drying, the crystal particles were lightly loosened by means of a juice mixer, and passed through a sieve with an aperture of 500 μm to remove coarse particles, whereby crystal particles having a mean particle diameter as identified in Table 2 were obtained. This operation was repeated several times to obtain 25 kg of the crystal particles.

Each of thus obtained sodium hydrogencarbonate crystal particles were packed in a packaging bag and put at the lowermost level in the same manner as in Example 1, and the caking property after 4 weeks was tested. The results of the test were as shown in Table 2. Here, the bag at the lowermost level among the five bags was the packaging bag having the sodium hydrogencarbonate crystal particles prepared in Example 2 packed therein, and the other bags were packaging bags having sodium hydrogencarbonate crystal particles prepared in Example 1 packed therein.

TABLE 2

|  | 1 | 2 | 3 | 4 |
|---|---|---|---|---|
| Mean particle diameter (μm) | 92 | 93 | 235 | 231 |
| Potassium concentration (mass ppm) | 63 | 9 | 72 | 7 |
| $Na_2CO_3$ concentration (mass %) | ≦0.1 | ≦0.1 | ≦0.1 | ≦0.1 |
| Rinse | Nil | Done | Nil | Done |
| Caking state | Remarkable | Nil | Remarkable | Nil |

TABLE 1

|  | 1 | 2 | 3 | 4 | 5 | 6 | 7 | 8 | 9 | 10 | 11 |
|---|---|---|---|---|---|---|---|---|---|---|---|
| Mean particle diameter (μm) | 90 | 95 | 92 | 97 | 95 | 99 | 92 | 231 | 243 | 241 | 235 |
| Potassium concentration (mass ppm) | 8 | 12 | 19 | 23 | 35 | 52 | 73 | 33 | 22 | 78 | 122 |
| $Na_2CO_3$ concentration (mass %) | ≦0.1 | ≦0.1 | 1.2 | ≦0.1 | ≦0.1 | ≦0.1 | ≦0.1 | ≦0.1 | 2.8 | ≦0.1 | ≦0.1 |
| Caking state | Nil | Nil | Slight | Slight | Slight | Remarkable | Remarkable | Slight | Remarkable | Remarkable | Remarkable |

As evident from the results shown in Table 1, it is found that sodium hydrogencarbonate crystal particles having a potassium concentration exceeding 50 mass ppm show a high caking property, and that sodium hydrogencarbonate crystal particles having a potassium concentration of at most 50 mass ppm and having a carbonate ion concentration of at most 0.1 mass % show a remarkably low caking property.

EXAMPLE 2

30 kg each of two types of granular sodium hydrogencarbonate crystal particles having mean particle diameters of 92 μm and 235 μm, respectively, and having potassium concentrations in the sodium hydrogencarbonate crystal particles of 63 mass ppm and 72 mass ppm, respectively, were prepared. 5 kg of each of the two types of sodium hydrogencarbonate crystal particles were contained in a suction filtration apparatus (Buchner funnel) having a diam- As evident from the results shown in Table 2, it is found that the potassium concentration of the sodium hydrogencarbonate crystal particles is lowered and caking tendency of the sodium hydrogencarbonate crystal particles is suppressed remarkably, by rinsing operation.

EXAMPLE 3

200 liter of each of 20 mass % sodium hydroxides having various potassium concentrations as impurities, was put in a vessel (500 liter) equipped with a stirrer, and the temperature was raised to 80° C. In this state, 100 vol % carbon dioxide gas was blown at a flow rate of 100 liter/min for 5 hours for reaction. Then, the temperature was lowered to 40° C., whereby sodium hydrogencarbonate crystal particles were crystallized. The crystallized crystal particles were subjected to centrifugal separation to separate the mother liquor, and then dried in an atmosphere of 40 vol % carbon dioxide gas at 70° C. for 5 hours. After the drying, the crystal particles were loosened by a juice mixer, and passed through a sieve with an aperture of 500 μm to remove coarse particles, whereby crystal particles having a mean particle diameter as identified in Table 3 were obtained.

Of each of the obtained sodium hydrogencarbonate crystal particles, the caking property was tested in the same manner as in Example 2. The results were as shown in Table 3.

TABLE 3

|  | 1 | 2 | 3 | 4 | 5 |
|---|---|---|---|---|---|
| Mean particle diameter (μm) | 171 | 185 | 157 | 169 | 191 |
| Potassium concentration in mother liquor (mass ppm) | 183 | 245 | 701 | 1454 | 3405 |
| Potassium concentration in crystal (mass ppm) | 18 | 24 | 63 | 164 | 393 |
| $Na_2CO_3$ concentration (mass %) | ≦0.1 | ≦0.1 | ≦0.1 | ≦0.1 | ≦0.1 |
| Caking state | Nil | Nil | Slight | Moderate | Remarkable |

As evident from the results shown in Table 3, it is found that crystal particles having a low potassium concentration can be obtained by controlling the potassium concentration in the mother liquor from which sodium hydrogencarbonate crystal particles are crystallized. The increase in the potassium concentration in the crystal particles is attributable to potassium in the mother liquor attached to the crystal particles after centrifugal separation.

REFERENCE EXAMPLE

The present Reference Example is to show that when calcium is contained in the mother liquor from which sodium hydrogencarbonate crystal particles are crystallized, calcium is incorporated into the crystallized sodium hydrogencarbonate crystal particles, as is different from the case of potassium, and as a result, there is no change in the Ca concentration contained in the crystal particles between before and after rinse of the crystal particles.

200 Liter of each of 20 mass % sodium hydroxides having various calcium concentrations was put in a vessel (500 liter) equipped with a stirrer, and the temperature was raised to 80° C. In this state, 100 vol % carbon dioxide gas was blown at a flow rate of 100 liter/min for 5 hours for reaction. Then, the temperature was lowered to 40° C., and thus crystallized crystal particles were subjected to centrifugal separation to separate moisture, and dried in an atmosphere of 40 vol % carbon dioxide gas at 70° C. for 5 hours. After the drying, the crystal particles were loosened by a juice mixer, and coarse particles were removed by means of a sieve with an aperture of 500 μm, whereby sodium hydrogencarbonate crystal particles were obtained. Adjustment of the mean particle diameter of the sodium hydrogencarbonate crystal particles was carried out by changing the stirring conditions at the time of crystallization.

5 kg of each of the above sodium hydrogencarbonate crystal particles were contained in a suction filtration apparatus (Buchner funnel) having a diameter of 50 cm having a filter paper (filter paper for qualitative analysis No. 2 manufactured by Advantec Co., Ltd.) set thereto. Using a separately prepared saturated aqueous solution of sodium hydrogencarbonate, the saturated aqueous solution was sprayed on the sodium hydrogencarbonate crystal particles contained in the Buchner funnel by means of a sprayer, to rinse the surface of the crystal particles. The rinsed sodium hydrogencarbonate crystal particles were dried in an atmosphere of 40 vol % carbon dioxide gas at 70° C. for 5 hours. After the drying, the crystal particles were loosened by means of a juice mixer and passed through a sieve with an aperture of 500 μm to remove coarse particles, whereby crystal particles having a mean particle diameter as identified in Table 4 were obtained.

The concentration of calcium contained in each of the obtained sodium hydrogencarbonate crystal particles was measured, and the results are shown in Table 4 as compared with the concentration of calcium contained in the sodium hydrogencarbonate crystal particles which were not rinsed with water. The calcium concentration was measured by means of atomic absorption photometer.

TABLE 4

|  | 1 | | 2 | | 3 | | 4 | |
|---|---|---|---|---|---|---|---|---|
| Mean particle diameter (μm) | 91 | 92 | 97 | 95 | 223 | 224 | 225 | 221 |
| Rinse | Nil | Done | Nil | Done | Nil | Done | Nil | Done |
| Calcium concentration in crystal (mass ppm) | 5 | 6 | 15 | 14 | 23 | 24 | 7 | 8 |

As evident from the results shown in Table 4, calcium contained in the raw material sodium hydroxide is incorporated into the inside of sodium hydrogencarbonate crystal particles when the crystal particles are crystallized, and can not be removed even by rinsing the crystal particles, in contrast to potassium as the subject of the present invention, which is not incorporated into the inside of the sodium hydrogencarbonate crystal particles when the crystal particles are crystallized, and which can be removed by rinsing, as mentioned above.

The present inventors estimate that this phenomenon is attributable to a high solubility of potassium bicarbonate in water and that potassium is less likely to be incorporated into the crystal particles of sodium hydrogencarbonate.

Further, for storage of the sodium hydrogencarbonate crystal particles obtained in the present invention, in order to further suppress caking, they are preferably hermetically sealed by a packaging material having a moisture permeability of at most 5 g/(m²·day) at 40° C. as stipulated in JIS Z0208, whereby the influence of slightly remaining potassium or sodium carbonate can be eliminated more effectively. The moisture permeability is defined as, when a packaging material as a boundary surface is kept in such a state that one side is exposed to the atmospheric air having a relative humidity of 90% and the other side is dried with calcium chloride, the mass of water vapor which passes through the boundary surface in 24 hours, and the mass of water vapor is converted to a value per unit area of the packaging material. A more preferred moisture permeability is at most 1 g/(m$^2$·day) at 40° C.

In the column 8 in Table 1 for Example 1, in a case where the crystal particles were packed by a packaging material of aluminum laminated polyethylene having a moisture permeability of at most 0.5 g/(m$^2$·day) instead of polyethylene having a moisture permeability of 10 g/(m$^2$·day) at 40° C., the caking state was "Nil".

According to the present invention, there is provided a novel method for producing sodium hydrogencarbonate crystal particles having a low caking property, useful in the sector of food products, pharmaceuticals, bath additives, etc., whereby the caking can be prevented even without using an anticaking agent or without using a special packaging material, and as a result, it is not required to select the type of the anticaking agent, or its use will not be limited.

The entire disclosure of Japanese Patent Application No. 2002-096672 filed on Mar. 29, 2002 including specification, claims and summary is incorporated herein by reference in its entirety.

What is claimed is:

1. A method for producing sodium hydrogencarbonate crystal particles having a low caking property, which comprises treating sodium hydrogencarbonate crystal particles having a mean particle diameter of from 50 to 500 μm (1) to lower the potassium concentration thereof to a level of at most 50 mass ppm and (2) to lower the carbonate ion concentration thereof to a level of at most 1 mass % which is the value converted from carbonate ion concentration to sodium carbonate concentration, wherein the potassium content in the sodium hydrogencarbonate crystal particles is lowered to a level of at most 50 mass ppm by rinsing the sodium hydrogencarbonate crystal particles with water or an aqueous solution containing sodium hydrogencarbonate, followed by drying.

2. The method for producing sodium hydrogencarbonate crystal particles having a low caking property according to claim 1, wherein said water or aqueous solution containing sodium hydrogencarbonate, is a saturated aqueous solution of sodium hydrogencarbonate.

3. The method for producing sodium hydrogencarbonate crystal particles having a low caking property according to claim 1, wherein the sodium hydrogencarbonate crystal particles are produced by crystallization from a mother liquor of an aqueous solution containing sodium hydrogencarbonate, wherein the potassium concentration in the mother liquor is lowered to a level of at most 400 mass ppm thereby to lower the potassium content in the sodium hydrogencarbonate crystal particles to a level of at most 50 mass ppm.

4. Sodium hydrogencarbonate crystal particles having a low caking property, which has a mean particle diameter of from 50 to 500 μm, a potassium concentration in the crystal particles of at most 50 mass ppm, and a carbonate ion concentration in the crystal particles of at most 1 mass %.

5. The method for producing sodium hydrogencarbonate crystal particles having a low caking property according to claim 1, wherein the potassium concentration is lowered to a level of at most 30 mass ppm.

6. The method for producing sodium hydrogencarbonate crystal particles having a low caking property according to claim 1, wherein the potassium concentration is lowered to a level of at most 10 mass ppm.

7. The method for producing sodium hydrogencarbonate crystal particles having a low caking property according to claim 1, wherein said drying is carried out in an atmosphere containing from 3 to 100 vol % of carbon dioxide.

8. The method for producing sodium hydrogencarbonate crystal particles having a low caking property according to claim 3, wherein the sodium hydrogencarbonate crystal particles are produced by crystallization from a mother liquor of an aqueous solution containing sodium hydrogencarbonate, wherein the potassium concentration in the mother liquor is lowered to a level of at most 300 mass ppm thereby to lower the potassium content in the sodium hydrogencarbonate crystal particles to a level of at most 30 mass ppm.

9. The method for producing sodium hydrogencarbonate crystal particles having a low caking property according to claim 3, wherein the sodium hydrogencarbonate crystal particles are produced by crystallization from a mother liquor of an aqueous solution containing sodium hydrogencarbonate, wherein the potassium concentration in the mother liquor is lowered to a level of at most 200 mass ppm thereby to lower the potassium content in the sodium hydrogencarbonate crystal particles to a level of at most 20 mass ppm.

* * * * *